(12) United States Patent  
Mikkelsen et al.

(10) Patent No.: US 8,719,241 B2  
(45) Date of Patent: May 6, 2014

(54) ASYNCHRONOUS PROCESS NOTIFICATION

(75) Inventors: Carl Mikkelsen, Wayland, MA (US); Somasundaram Meiyappan, Singapore (SG); Aleksander Soltan, Waltham, MA (US)

(73) Assignee: Conexant Systems, Inc., Irvine, CA (US)

( * ) Notice: Subject to any disclaimer, the term of this patent is extended or adjusted under 35 U.S.C. 154(b) by 198 days.

(21) Appl. No.: 13/149,735

(22) Filed: May 31, 2011

(65) Prior Publication Data

US 2012/0310993 A1 Dec. 6, 2012

(51) Int. Cl.  
*G06F 17/30* (2006.01)

(52) U.S. Cl.  
USPC ........................................... 707/704

(58) Field of Classification Search  
USPC ............... 707/609–612, 703, 704, 736–740, 707/765–769, 781–783  
See application file for complete search history.

(56) References Cited

U.S. PATENT DOCUMENTS

| | | | |
|---|---|---|---|
| 7,730,258 B1 * | 6/2010 | Smith et al. | 711/114 |
| 7,958,169 B1 * | 6/2011 | Witte et al. | 707/825 |
| 8,189,225 B1 | 5/2012 | Lo et al. | |
| 2002/0038301 A1 * | 3/2002 | Aridor et al. | 707/10 |
| 2002/0133647 A1 * | 9/2002 | Kasper | 710/29 |
| 2004/0002972 A1 * | 1/2004 | Pather et al. | 707/6 |
| 2006/0002314 A1 * | 1/2006 | Fukunaga et al. | 370/257 |
| 2007/0121850 A1 * | 5/2007 | Klos et al. | 379/114.28 |
| 2007/0169123 A1 * | 7/2007 | Hopkins | 718/100 |
| 2010/0073707 A1 | 3/2010 | Ferlitsch | |
| 2010/0268904 A1 * | 10/2010 | Sheffield et al. | 711/163 |
| 2011/0007347 A1 | 1/2011 | Kamath et al. | |
| 2011/0188063 A1 | 8/2011 | Nuggehalli et al. | |
| 2011/0235085 A1 | 9/2011 | Jazayeri et al. | |
| 2011/0255128 A1 | 10/2011 | Ozawa | |
| 2011/0299110 A1 | 12/2011 | Jazayeri et al. | |
| 2012/0023077 A1 * | 1/2012 | Kann et al. | 707/702 |
| 2012/0057193 A1 | 3/2012 | Jazayeri et al. | |
| 2012/0099146 A1 | 4/2012 | Stokes et al. | |
| 2012/0140285 A1 | 6/2012 | Kamath et al. | |

* cited by examiner

*Primary Examiner* — Wilson Lee  
(74) *Attorney, Agent, or Firm* — Jackson Walker L.L.P.; Christopher J. Rourk

(57) ABSTRACT

A database system comprising a node value stored in a first electronic data memory device sector. A lock state and access visa associated with the node value, such that if the visa is non-zero, the visa must be presented to access the node. A notification field associated with the node value, the notification field stored in a second electronic data memory device sector. An update processor configured to electronically retrieve and process the notification field if the node value is modified.

20 Claims, 6 Drawing Sheets

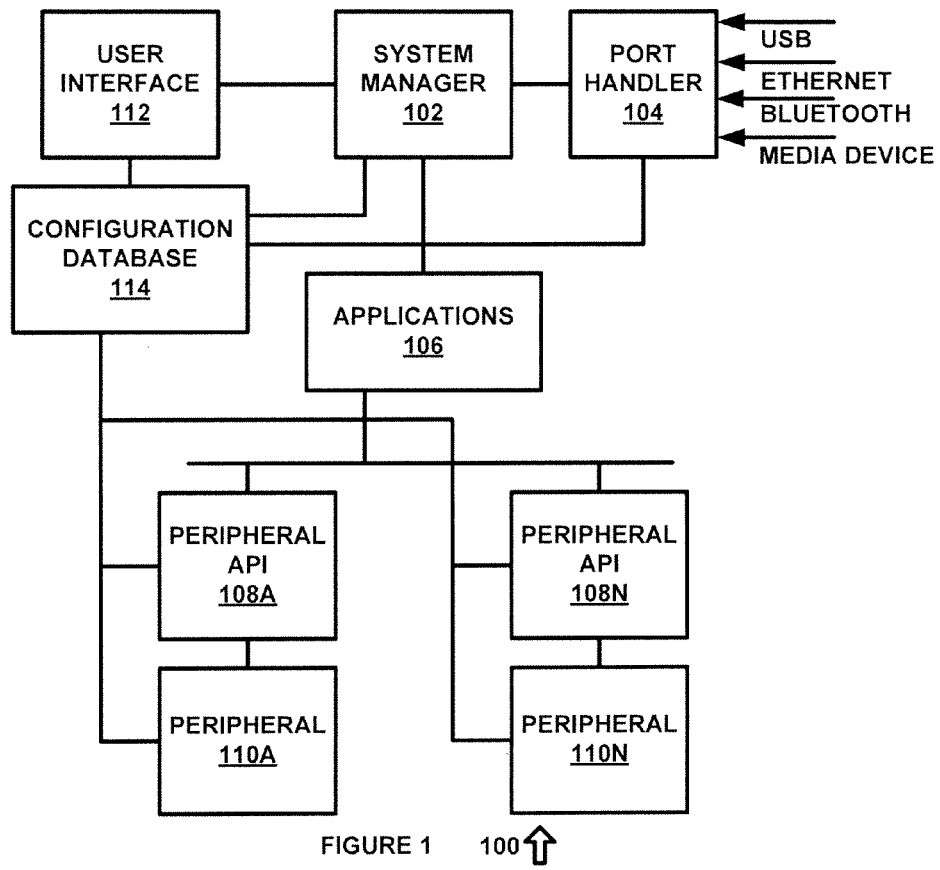
FIGURE 1    100
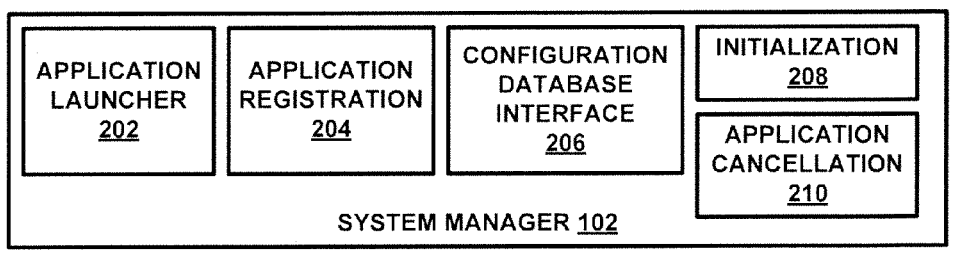
FIGURE 2    200

ASYNCHRONOUS PROCESS NOTIFICATION

RELATED APPLICATIONS

This application is related to the following commonly owned and co-pending applications, which are filed concurrently herewith: Ser. No. 13/149,713, entitled "Regular Expression Selection for Configurable Application Data Steering;" Ser. No. 13/149/713, entitled "Database Hierarchical Inheritance;" and Ser. No. 13/149,747, entitled "Persistent Data Storage."

TECHNICAL FIELD

The application relates generally to multi-component systems, and more specifically to a multi-component process notification system that uses a database for communcation activities, including change notification.

BACKGROUND OF THE INVENTION

An unsolved problem in a multi-component system is the dissemination of data that defines changes to system/component states, settings, or configurations to other interrelated systems/components. In a modularized system consisting of independently developed components, it is not feasible for each system that changes information to know the systems that must react to the change. It is also not efficient for each system to frequently check to see if a change has occurred.

Some systems address this problem by creating a network of subscriptions in which a component that changes information maintains a list components needing notification of a change, but this suffers from the problem that the system that changes information must be identified by those system needing notification, and that the critical information must be identified a-priori.

A more general approach is to identify all critical data within a system, and for any component changing such data to send a notification message, perhaps through a dispatch service. This approach also requires that the critical information be identified in advance, and requires that each component changing such data send notification. A common programming error is to change critical data and not cause such notification.

Although details vary with each implementation, this summarizes the current known techniques for dissemination of such information within such systems.

SUMMARY OF THE INVENTION

A database system is provided that includes a node value stored in a first electronic data memory device sector, such as where the database is comprised of nodes. A lock state and access visa is associated with the node value, such that if the visa is non-zero, the visa must be presented to access the node. A notification field is also associated with the node value, where the notification field is stored in a second electronic data memory device sector. An update processor retrieves and processes the notification field if the node value is modified, such as to provide notification to a system or device.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE SEVERAL VIEWS OF THE DRAWINGS

Aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views, and in which:

FIG. 1 is a diagram of a system for configuring and accessing a configuration database in accordance with an exemplary embodiment of the present invention;

FIG. 2 is a diagram of system for providing system manager functionality in accordance with an exemplary embodiment of the present disclosure;

DETAILED DESCRIPTION OF THE INVENTION

Figure 3:
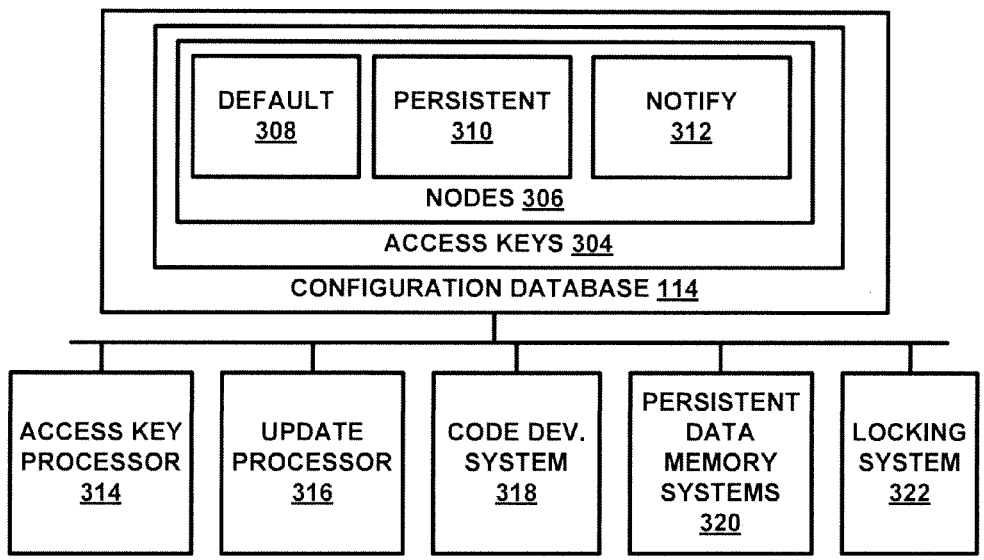
FIG. 3 is a diagram of a system for providing configuration database functionality in accordance with an exemplary embodiment of the present disclosure.

A detailed description of embodiments of the present disclosure is presented below. While the disclosure will be described in connection with these drawings, there is no intent to limit it to the embodiment or embodiments disclosed herein. On the contrary, the intent is to cover all alternatives, modifications and equivalents included within the spirit and scope of the disclosure.

FIG. 1 is a diagram of a system 100 for configuring and accessing a configuration database in accordance with an exemplary embodiment of the present invention. System 100 can be implemented in hardware or a suitable combination of hardware and software, and can be one or more software systems operating on a multi-function peripheral processor, a digital signal processor or other suitable general or special purpose processing systems.

As used herein, and by way of example and not by limitation, "hardware" can include a combination of discrete components, an integrated circuit, an application-specific integrated circuit, a field programmable gate array, a general purpose processing server platform, or other suitable hardware. As used herein and by way of example and not by limitation, "software" can include one or more objects, agents, threads, lines of code, subroutines, separate software applications, one or more lines of code or other suitable software structures operating in one or more software applications or on one or more processors, or other suitable software structures. In one exemplary embodiment, software can include one or more lines of code or other suitable software structures operating in a general purpose software application, such as an operating system, and one or more lines of code or other suitable software structures operating in a specific purpose software application.

System 100 includes system manager 102. System manager 102 manages the resources of system 100, such as port handlers 104, applications 106, peripheral application programming interface (API) 108A through 108N, peripheral 110A through 110N and configuration database 114. The control of resources is managed by the components that need the resources. For example, user interface 112, system manager 102 and applications 106 do not need to know the address of memory buffers or other resources that are needed by a peripheral 110A through 110N, such as a scanner or a printer. By distributing control, system manager 102 can be used for other purposes, such as to determine whether an application can be started. For example, user interface 112 does not need to determine if the printer is currently printing. This architecture eliminates the possibility for system error to be caused, such as from race conditions between an application and a user requesting functions from user interface 112.

System 100 further includes peripheral API 108A through 108N, which can be a common API for applications 106 that are accessed by system manager 102. In one exemplary embodiment, user interface 112 can communicate parameters to applications 106 through configuration database 114 instead of the peripheral API 108A through 108N for applications 106. In this manner, the only data that system manager 102 needs to launch an application is the entry point.

Applications 106 register with system manager 102 by providing a name (as a string), and data that defines how to pass control to each application. For example, this data can include an entry point address, a command line that is used to launch the application, or other suitable data. In this manner, system manager 102 does not need to be pre-loaded with data that defines applications 106 that are built into a product that uses system 100. System manager 102 can manipulate applications, but does not maintain data that identifies which applications exist.

When user interface 112 or any other suitable system needs to invoke an application, a request is transmitted to system manager 102, which can start an application by name, by matching against the members of a class, or in other suitable manners. To match against a class, the requesting system transmits a string to system manager 102, such as the first bytes from a file to be processed, and a class name. System manager 102 matches the string against the regular expressions registered with each application, looking for a match. If a match is found, the application name is used as if the name had been provided to system manager 102 as the application name.

FIG. 2 is a diagram of system 200 for providing system manager functionality in accordance with an exemplary embodiment of the present disclosure. System 200 includes system manager 102 and application launcher 202, application registration 204, configuration database interface 206, initialization 208 and application cancellation 210, each of which can be implemented in hardware or a suitable combination of hardware and software.

Application launcher 202 can be provided for use with a user interface function and other parts of system 100 that need to start an application or monitor the status of an application. Such user interface functions can also allow the status of the application to be determined. For example, a gross status indicator can be used to provide information about the current execution state of the application, such as whether execution is pending, has been started, has started and failed, has completed, or other suitable state information. Communication of the status between the user interface (or other system) and the application is accomplished using configuration database 114.

Applications can be launched into a suitable execution slot by immediately being launched through a start API, by being launched later after a user-defined delay through a delay API (such as to launch applications at a scheduled time), or in other suitable manners. In one exemplary embodiment, system manager 102 can create an activity node and return a node reference through an "activity" parameter. A persistent node can also be used to store application launch information so that a loss of power before the application is launched does not prevent the application from starting.

Application registration 204 registers applications with configuration database 114 and other suitable systems. In one exemplary embodiment, an application can be named using a hierarchical naming scheme, such as an XML-based scheme, so as to allow the application name to also be a node identifier in configuration database 114. An application can also be registered as a member of a class.

Configuration database interface 206 provides an application programming interface or other suitable interface to configuration database 114. In one exemplary embodiment, configuration database 114 can be used by system manager 102 and other systems to communicate status information or other suitable information for applications or other components of system 100. System manager 102 thus interfaces with configuration database 114 through configuration database interface 206 to start or terminate applications, to facilitate communications between applications or components, or for other suitable purposes.

Initialization 208 performs initialization operations for system manager 102 and configuration database 114, such as to initialize a number of processor slots, to allocate memory, and to perform other suitable operations. In one exemplary embodiment, an estimated size is obtained to determine an amount of memory to be reserved for the database storage, such as by using an average number of size times a number of database entries or in other suitable manners. Initialization 208 can populate configuration database 114 with initial contents, such as by using a bulk population procedure. Bulk population of the database can be done 1) using an XML stream that adheres to the hierarchical naming schema, 2) by pointing to an object that contains such an XML stream, 3) from streams that follow the proprietary format in which persistent objects are stored, or in other suitable manners. A complementary function can be used to convert database context into a bulk structure. In another exemplary embodiment, API calls can be used to set the initial contents of nodes associated with the keys of configuration database 114.

Application cancellation 210 performs cancellation processing for an application that has been scheduled, an application that is in operation, or other suitable activities. Typically, a cancellation routine is required to cancel an application or activity. An activity can be cancelled where the application itself will not be cancelled, such as a print job for a printer. Two APIs can be provided to assist with canceling such activities. The first API can be a helper function that provides a list of activities that can be canceled, such as with an option to retrieve only the activity of the highest hierarchy if the intention is to cancel the application. The second API can be used to trigger a cancellation of an activity. For example, if an activity has not started (such as a delayed start application), then the node can be deleted and a callback can be made to let the associated client know that the application was cancelled and never started. For an application that has never started, the cleanup function can still be called at the end of the cancellation procedure.

Application cancellation can provide the callback indirectly, where a piece of code that requires confirmation of a completed cancel is registered for a notification function through configuration database 114 for the node. The reapplication cancellation can also be provided through a configuration database 114 node or in other suitable manners, such as for debugging or other suitable purposes. The calling thread information and current time can also be recorded before submitting the activity to application cancellation 210 for canceling the activity. The activity is deemed canceled when the activity sets its completion status in configuration database 114. Application cancellation 210 can then delete the activity from an activities tree.

In operation, system 200 provides system manager 102 functionality that is used to manage operations of the components of system 100 in accordance with the present disclosure. System 200 uses configuration database 114 to communication between components of system 100.

FIG. 3 is a diagram of a system 300 for providing configuration database functionality in accordance with an exemplary embodiment of the present disclosure. System 300 includes configuration database 114 and access keys 304, nodes 306, default nodes 308, persistent nodes 310, notify nodes 312, access key processor 314, update processor 316, code development system 318, persistent data memory systems 320 and locking system 322, each of which can be implemented in hardware or a suitable combination of hardware and software.

Access keys 304 are used to access data stored in configuration base 114. An access key can be named using a hierarchical naming schema, such as an XML-compliant naming schema. In one exemplary embodiment, an XML-based naming schema might result in an access key having a value of "/A/B/C/D," where a text string is associated with each of the variables A through D.

Nodes 306 refer to the data strings stored within configuration database 114. A node can be characterized as a key value that contains sub-keys, and the terms "node," "key," "sub-node" and "sub-key" can refer to the same data structure, but connote different relative meanings. For example, a key is used to locate a node, and the node associated with the key will typically include additional data beyond that data that defines the key. Likewise, a node may have associated sub-nodes, where the key that is used to locate a node can also be used to locate the associated sub-nodes. Data can be stored in a node in a suitable predetermined data format. A node can also have associated sub-nodes, such as default nodes 308, persistent nodes 310 and notify nodes 312 or other suitable sub-nodes.

Default nodes 308 are used to provide data for a node that is automatically constructed. In one exemplary embodiment, a node can be automatically constructed in configuration database 114 in order to allow systems and components of system 100 to communicate with each other. In this exemplary embodiment, a default node can be created as a sub-node for a related class, such as a print sub-node for data that defines a print job. The new print sub-node can contain all of the data required for the print job to be processed, and can be created as a print node sub-node, where the default node settings, notification node settings and persistent node settings are used to coordinate processing of the print job, as further described herein.

A default node value can be stored in configuration database 114 and associated with a node. Access key processor 314 can return the default node value as part of a revised input value. For example, access key processor 314 can be configured to return part the input value as part of the revised input access key, where a hierarchical naming schema such as an XML-compliant naming schema or other suitable schema are used. In this exemplary embodiment, an XML-based naming schema might result in an input of "/A/B/C/D" to access key processor 314, and a default node value may exist for "/A/B/C," "/A/B" or "/A." The default node value can be used to provide the root for a new input key, such as "/X/Y/Z," where the entire new input key would be "/X/Y/Z/D." A default node value can be generated if an associated node value is not stored in the configuration database for an associated key value.

A node can have a default sub-node that is used to handle a request for information, which is presented by submitting a key value for a node, when there is no associated information stored at the node for that key value. The default sub-node can contain a name of another node that can be searched to satisfy the request. Rather than giving each key a default value, an hierarchal system of inheritance can be provided that determines defaults. For example, if a node value for key is not found in the database, a SOUGHT_NAME variable can be set to be the final name in the key. In this example, if the key is "/A/B/C/D/NumCopies", then SOUGHT_NAME would be set to "NumCopies". A SEEKING_NODE variable can be set to be the key with the final slash and name removed. Using the above example, in the above case, SEEKING-NODE would be "/A/B/C/D." If a default value for SEEKING_NODE exists, a new key is constructed based on the value. In the above example, if the value of "/A/B/C/D/DEFAULT" is "/X/Y/Z", then the new search is set to be to be "/X/Y/Z/Numcopies," and the search is repeated using the new key. If the SEEKING_NODE is equal to the root value, such as "/," then the search has failed. If no value for the default in the SEEKING_NODE exists, the final name is moved from the end of SEEKING_NODE to SOUGHT_KEY. For example, SOUGHT_NAME becomes "D/NumCopies", and SEEKING_NODE becomes "/A/B/C," and the search is repeated again.

Persistent nodes 310 are nodes containing data that is stored in a persistent electronic memory, such as NVRAM. Persistent node data can be stored using string keys and simple values in a tagged, self-describing data structure, unlike the anonymous, untagged (i.e. not self-describing) structures stored in NVRAM with a standard NVRAM API. Storing data in a string-based, self-describing structure is less storage efficient than pure binary encoding, but one benefit of string-based storage is that when different versions of firmware that utilizes the data are stored to a flash memory device, the database remains intact and usable. In an untagged data structure, the data would be preserved, but if the binary layout of the data changed, it would be unusable to new firmware. For such new firmware, any stored values would automatically revert to "factory default" settings. By using a tagged data structure, any new values will assume the factory default values, but any pre-existing values will be preserved.

To associate a portion of the database with a record in NVRAM or other suitable nonvolatile memory, the value of a persistent node identifier is set to equal the name of the NVRAM object, and a "persistent" key is associated with the node. All nodes or sub-nodes under the node can also be serialized into the object, and nodes at various sections of a database tree can be assigned to the same NVRAM object.

In one exemplary embodiment, persistent nodes 310 can be used to prevent interruption of scheduled tasks if a loss of power occurs. In this example, if a print job has been created and stored to a print node, the print job can inherit a default persistent node setting, such that the print job node data is backed up in persistent data memory systems 320, and is only deleted from persistent data memory systems 320 when the print job completes. In this manner, the print job data can be restored if a loss of power occurs before the print job completes.

Notify nodes 312 are utilized by the configuration database to transmit change data to any component that needs to know when a change occurs to a node. In one exemplary embodiment, a "notify" node or tag (such as a data field contained within a node) can be attached or associated with the selected node. The node associated with the notify tag can contain notification data (such as a single value), can be a node that contains sub-nodes, or can be other suitable data structures. In this exemplary embodiment, pairs of addresses and parameters can be associated with or stored in the notify node. When the notify node is triggered, each of the functions identified by the address can be called with the given parameter and a reason for why the function is called (such as when the node has changed, when the node has been deleted, or when a new sub-node has been added).

In another exemplary embodiment, a user interface system can be used to monitor processes such as print jobs. In this exemplary embodiment, control of the print jobs can be coordinated between user interface 112 (which receives user entered control data), system manager 102 (which launches the printer application in response to the user-entered control data), the peripheral 110A through 110N (that is associated with the printer) and other components of system 100, each of which communicate through configuration database 114 by accessing data stored in nodes of configuration database 114. The print job data can be stored to a new node that is a sub-node of a print node, where the print node includes an associated notify node that notifies the associated printer that a print job is available and needs to be retrieved for processing. The new node can be created using data stored in one or more default nodes associated with the print node or sub-nodes (such as sub-nodes for specific printers or types of print data). As the print job is processed, status updates can be transmitted from the printer back to configuration database 114 (such as "printing," "offline," or "finished"), and a notify node associated with the printer status node can transmit the status data to user interface 112. In this manner, all communication can be handled through configuration database 114 without the need for a communications infrastructure.

Access key processor 314 can receive an input value, such as an input key, and return the associated node value for the input value if the input value matches an access key. In general, the access key will be stored in a first memory device sector and the associated node data will be stored in a second memory device sector, but the keys and nodes can also or alternatively be stored in separate memory devices If the input value does not match an access key stored in the first memory device sector, then access key processor 314 generates a revised input value containing a default node value, if one exists. In one exemplary embodiment, access key processor 314 can modify the input key to search for a default node value, such as by using a root portion of the input key to search for an associated default node value or default search key, and returns a search failed indication if no default node value is stored in the second data memory device sector and associated with the portion of the input value.

Update processor 316 can process notification field data if data associated with a notify node 312 is modified. In one exemplary embodiment, update processor 316 can retrieve a function stored in a sub-field of the notification field and can execute the function, such as to transmit other sub-fields contained within the notification field data to an address stored in a sub-field of the notification field. As previously discussed, the address can be associated with a component of system 100, such as user interface 112, one of peripherals 110A through 110N, or other suitable components.

Code development system 318 allows a user to associate default nodes 308, persistent nodes 310, notify nodes 312 or other suitable nodes with nodes or components that are stored in configuration database 114 while creating applications for use with system 100. In one exemplary embodiment, a user can: identify data as being required for a default node, such as to accommodate and configure new peripherals; identify data as being required to be stored as persistent data, such as user preference settings for peripherals; and identify a component or system that should be notified if a node is changed, deleted or if sub-nodes are added, such as for a status indicator on a user interface. Other suitable applications can also or alternatively be created using code development system 318, and code development system 318 provides the functionality for creating applications or other software code that utilizes the data functions and structures disclosed herein.

Persistent data memory systems 320 are one or more non-volatile data memory devices that are used to store configuration data, such as user preferences. Persistent data memory systems 320 can be updated in conjunction with persistent nodes 310 or in other suitable manners.

Locking system 322 locks nodes and sub-nodes based on data received from systems and components that access the nodes, to control simultaneous access. The operation to lock a node returns a key, which may be referred to as an access code or visa, that must be presented with subsequent requests to access, in order to unlock the node. In one exemplary embodiment, when a lock is accessed by a function, four parameters can be passed: the context, the name, the visa, and the wait behavior. Likewise, other suitable parameters can be used to access a locked node.

In one exemplary embodiment, a lock operation performed on a node can be used to implement a "direct lock," and any sub-nodes that inherit the locked state can be used to implement an "inherited lock." In this exemplary embodiment, a node with a direct lock may not be locked again, whereas a sub-node with an inherited lock can be locked if the visa is presented. If the visa is correct, a new visa can be returned, where the new visa can be used to access the sub-node and its contents. In this exemplary embodiment, the visa corresponding to the inherited lock can be deactivated, such that it no longer gives access to the sub-node or its contents. When a node is locked, all reads, writes, and locks are prohibited unless the proper visa is passed with the call. Notification and persistent data processing can also be deactivated for a locked node. When a node is unlocked and is not a sub-node of any locked node, any pending notifications and persistent data processing can be performed.

In operation, system 300 facilitates communication between components and systems of system 100 through configuration database 114. Through the use of default nodes 308, persistent nodes 310 and notify nodes 312, these components and systems can communication with each other and process data, such as data for a multi-function peripheral or other suitable data.

Figure 4:
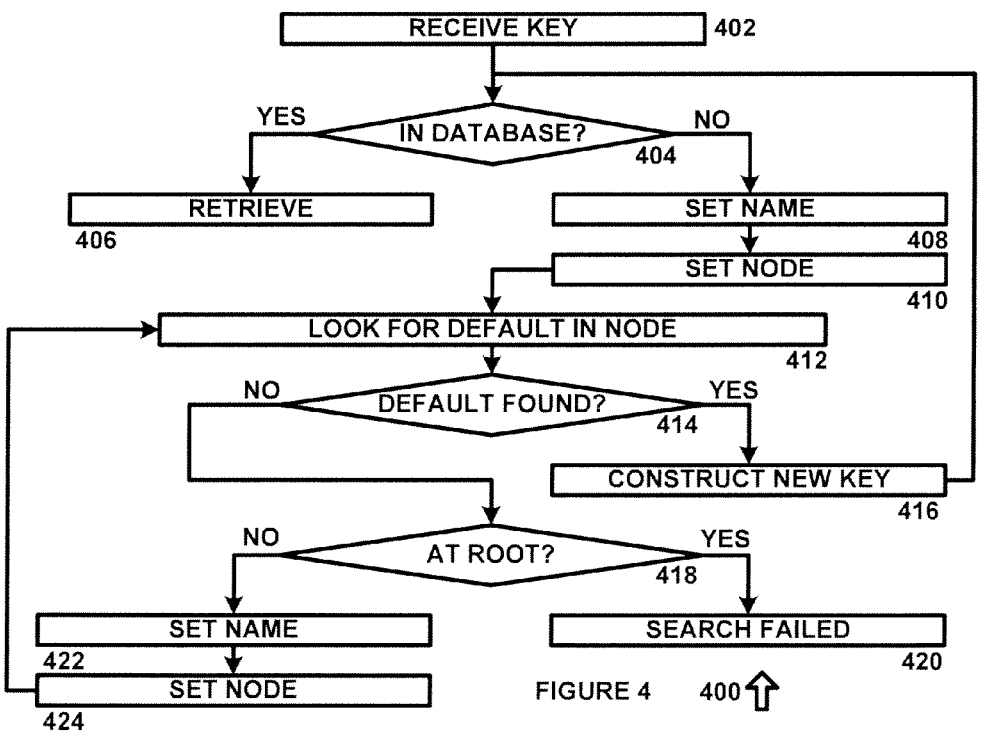
FIG. 4 is a flow chart of an algorithm for processing a key to identify a default node in accordance with an exemplary embodiment of the present disclosure.

FIG. 4 is a flow chart of an algorithm 400 for processing a key to identify a default node in accordance with an exemplary embodiment of the present disclosure. Algorithm 400 can be implemented in hardware or a suitable combination of hardware and software, such as by converting the flowchart algorithm to software code that will operate on a multi-function peripheral processor using standard programming techniques.

Algorithm 400 begins at 402 where a key is received. The key can be received as encoded data from system manager 102 or other suitable systems, and can have a predetermined data format that is defined by a number of fields and data type (such as alphanumeric). The key can be named using a hierarchical naming convention, such as an XML naming convention, or in other suitable manners. For example, the key can be named A/B/C/D, where A-D can be any suitable text string. The algorithm then proceeds to 404.

At 404, it is determined whether the key matches a key value in the configuration database. The match can be determined using a suitable matching or look-up algorithm, such as an algorithm that searches through an ordered list or other suitable algorithms. If a match is found, the algorithm proceeds to 406 and the value corresponding to the key is retrieved from the database, such as by copying a data field stored in the database that is associated with the key. Otherwise, the algorithm proceeds to 408, where a name is set. In one exemplary embodiment, the name can be set by using the least significant text string of the hierarchical key name, such as the text string associated with "D" in the example above, or in other suitable manners. The algorithm then proceeds to 410, where the node is set. In one exemplary embodiment, the node can be the remainder of the key name other than the least significant text string, such as "A/B/C" in the example above. The algorithm then proceeds to 412.

At 412, it is determined whether a default name value exists for the node assigned in 410. If it is determined at 414 that a default name has been found, the algorithm proceeds to 416 where a new key is constructed using the default name and the name set at 408. For example, if the default name value is "X/Y/Z," then the new key would be "X/Y/Z/D." The algorithm then returns to 404.

If it is determined at 412 that no default name value exists, the algorithm proceeds to 418, where it is determined whether the key is at a root. For example, using the naming convention discussed above, if the remaining key is "/D," then the key is at a root (i.e. "/") and no additional searching can be performed. The algorithm proceeds to 420 where a search failed indicator is generated. Otherwise, the algorithm proceeds to 422 where the name is set. Using the above example, the new name setting when the search for "/A/B/C/D" has not resulted in an associated node or a default for "/A/B/C," the new name would be "/C/D" for the second default node search. The algorithm then proceeds to 424 where the node is set, such as to "/A/B," for the example described above. The algorithm then returns to 412, where a search for a default node for the new node value is performed.

In operation, algorithm 400 allows a default node value structure to be used in a configuration database that allows default values for nodes to be assigned to identify information for an unidentified node. Algorithm 400 seeks for the default value that is closest to the new node value by checking each node in a hierarchical naming scheme for a default node value, starting with the node closest to the new node in the naming scheme and ending with the root node, after which a search failed indicator is returned.

Figure 5:
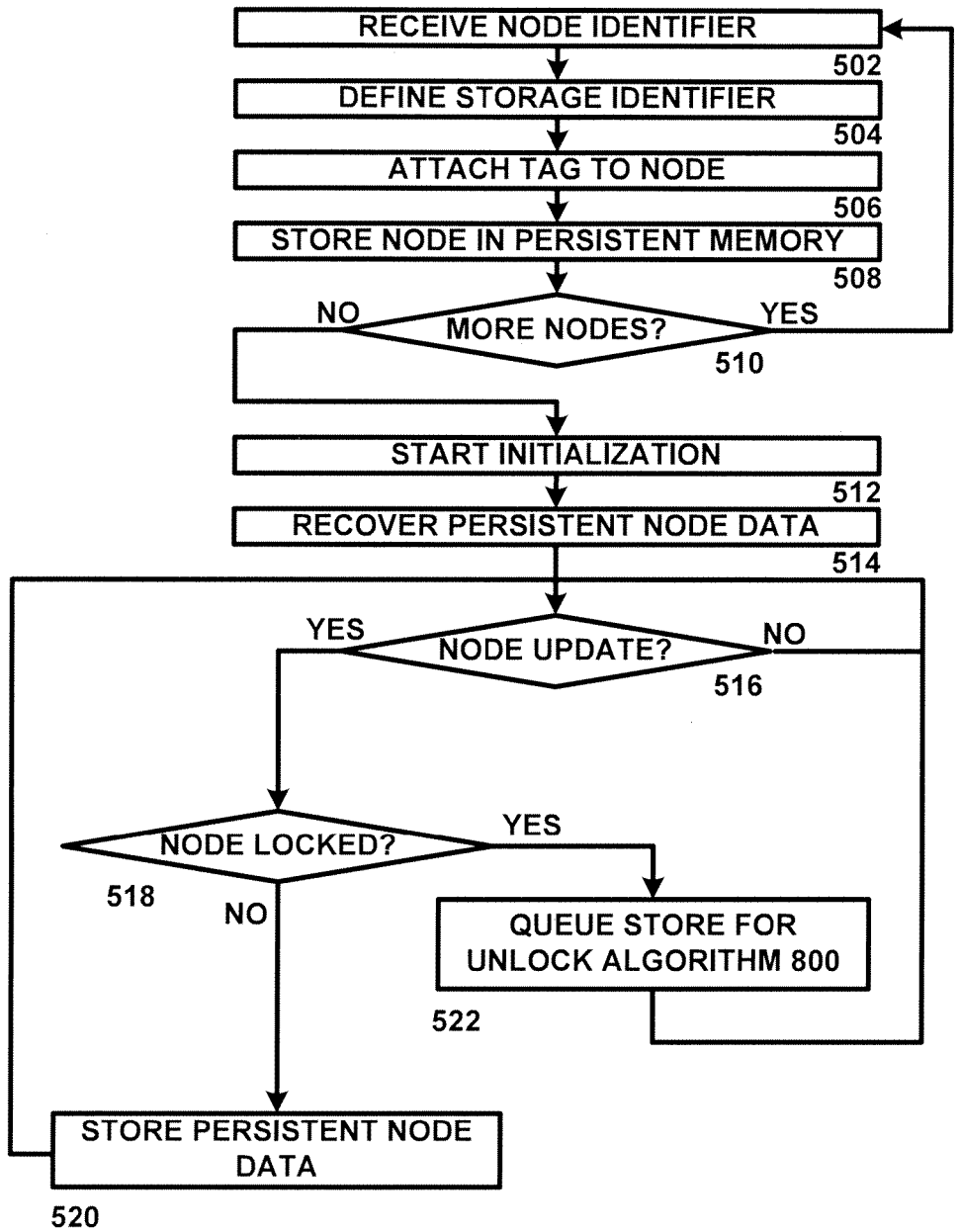
FIG. 5 is a flow chart of an algorithm for persistent storage of data associated with a node in a configuration database in accordance with an exemplary embodiment of the present disclosure.

FIG. 5 is a flow chart of an algorithm 500 for persistent storage of data associated with a node in a configuration database in accordance with an exemplary embodiment of the present disclosure. Algorithm 500 can be implemented in hardware or suitable combination of hardware and software, such as by converting the flowchart algorithm to software code that will operate on a multi-function peripheral processor using standard programming techniques.

Algorithm 500 begins at 502 where a node identifier is received. In one exemplary embodiment, the node identifier can be received when the node is created using a software development kit as part of an application that uses a configuration database to store data associated with the node or in other suitable manners. The algorithm then proceeds to 504.

At 504, a storage identifier is defined, such as by using the software development kit to identify a persistent data memory device, such as a nonvolatile data memory device, a magnetic drive, an optical data storage device or other suitable persistent data memory devices. The algorithm then proceeds to 506.

At 506, a tag is attached to a node that associates the data stored at the node with a storage identifier. In one exemplary embodiment, the tag can be attached to the node when an application is being created or modified by a programmer, such as when the programmer indicates that data should be stored in a persistent data storage device. The algorithm then proceeds to 508.

At 508, the node data is stored in the associated persistent data memory device. In one exemplary embodiment, the node data can be stored when it is created for each node, the node data can be stored after programming for a module or application has been completed, or other suitable processes can be used. The algorithm then proceeds to 510.

At 510, it is determined whether more nodes are to be generated or processed. If it is determined that more nodes are to be generated or processed, such as when an application is being developed or compiled, the algorithm returns to 502. Otherwise, the algorithm proceeds to 512.

At 512, a database is initialized. In one exemplary embodiment, the initialization can be performed for a configuration database when a multi-function peripheral is powered on or in other suitable manners. The algorithm then proceeds to 514.

At 514, persistent node data for the nodes of the database is recovered. In one exemplary embodiment, the nodes of the database with associated tags can be identified, and the data stored in persistent memory devices can be retrieved and used to populate the database. The algorithm then proceeds to 516.

At 516, it is determined whether a node has been updated. In one exemplary embodiment, a node can be used to store user settings for devices such as printers, fax machines, or other suitable peripherals. When a user changes a setting, the setting data can be stored at a node in a configuration database. If a node has not been updated, the algorithm returns and waits for a node to be updated. Otherwise, the algorithm proceeds to 518.

At 518, the node is checked to see if it is locked If the node is locked, the algorithm proceeds to 522. If the node is not locked, the algorithm proceeds to 520.

At 520, the updated node data is stored in the persistent data memory device. In one exemplary embodiment, the persistent data memory device can be identified using the tag data and the updated node data can be stored in the associated persistent data memory device using a suitable data storage process. The algorithm then returns to 514.

At 522, the information to update the associated persistent data memory device is queued for later processing by an unlock algorithm.

In operation, algorithm 500 allows data that should be maintained in a persistent data memory device to be easily identified, updated and recovered. Algorithm 500 can be used by programmers during the application coding process to create a structure within the application code for providing for persistent storage of selected data that is determined by the developer to be suitable for persistent storage, such as user setting selections for peripheral devices.

Figure 6:
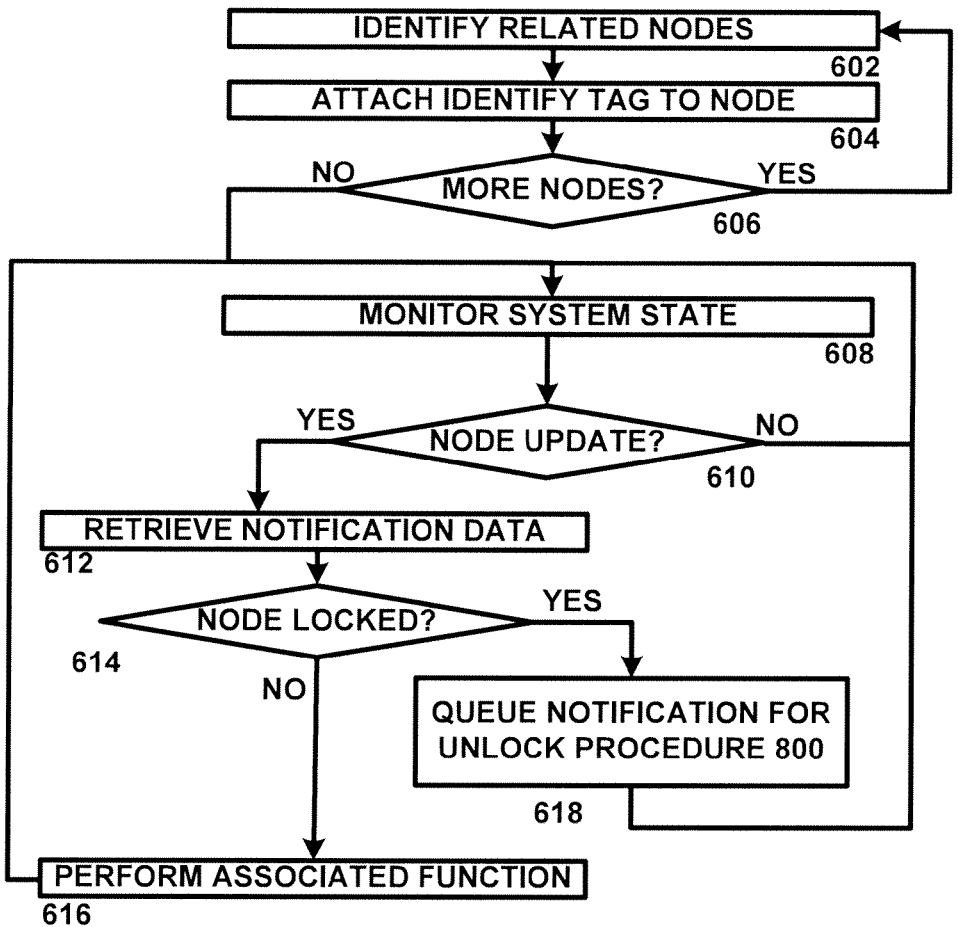
FIG. 6 is a flow chart of an algorithm for generating notification data for a database node in accordance with an exemplary embodiment of the present invention.

FIG. 6 is a flow chart of an algorithm 600 for generating notification data for a database node in accordance with an exemplary embodiment of the present invention. Algorithm 600 can be implemented in hardware or a suitable combination of hardware and software, such as by converting the flowchart algorithm to software code that will operate on a multi-function peripheral processor using standard programming techniques.

Algorithm 600 begins at 602, where a related node for an application is identified. In one exemplary embodiment, the node can be identified using a function for retrieving setting a key value, such as key value "get" function or a key value "set" function. In this exemplary embodiment, a set function which implies nodes that do not exist can cause those nodes to be created. If a type of the key does not result in a match when a "get" function that uses the key as an argument is called, the function can return an error, whereas if the type of a key does not match when a "set" function is called, the type can be changed.

A "set" function call can create a key in the context if it does not already exist, and a "get" function call can return a value from a default setting, if a default setting exists. A "set" function call does not change the default. In addition, after a "set" function call, any node having an associated persistent tag is updated in the persistent data memory if it is not locked. If the node is locked, the update can be delayed until all locks are removed from the node.

After a "get" or "set" function call, notification processing can be performed by looking in the node that contains the changed key for a "notify" tag. If a "notify" tag is present and the node does not have a lock, a configuration database system manager can call each of the entries in the "notify" tag and search for each of the containing contexts. If a context is present and the node is has a lock, the notification can be delayed until all locks are removed from the node, such as where bottom-up processing is necessary so that a subscription to a lower level node does not interrupt subscriptions to a higher level node.

For a notification "get" or "set" function, an address the function to be called for notification can be provided, as well as a value for the first argument to be passed to the notification function. Additional data, such as a reason parameter, can be provided that identify a reason that a notifier was called, such as an object add, an object delete, an object change, other suitable reasons or a combination of suitable reasons. Restrictions can also be imposed on the notification function, such as to prevent a configuration database application programming interface from being called from the notification callbacks. The algorithm then proceeds to 604.

At 604, a notification tag is attached to the node. As discussed above, the notification tag can include an address of a function to be called, a value for a first argument, or other suitable data. The algorithm then proceeds to 606.

At 606, it is determined whether any additional nodes are to be processed. If no additional nodes are to be processed, the algorithm proceeds to 608, otherwise the algorithm returns to 602.

At 608, a system state is monitored, such as by a system manager of a configuration database or other suitable systems. The algorithm then proceeds to 610 where it is determined whether a node has been updated, such as if an object has been added, changed, deleted or if other suitable node updates have occurred. If no update has occurred, system state monitoring continues. Otherwise, the algorithm proceeds to 612.

At 612, notification data associated with a node is obtained, as discussed above. The algorithm then proceeds to 614.

At 614 it is determined if the node is locked. If the node is not locked, the algorithm proceeds to 616 where the associated function is called, as described above. If the node is locked, the algorithm proceeds to 618.

At 616 the notification function is called with the notification function argument and the reason for the notification. The algorithm then proceeds to 608 to wait for the next change.

At 618 the notification function, the notification function argument, and the reason for the notification are queued for subsequent processing by an unlock algorithm. The algorithm proceeds to 608 to continue monitoring for changes to the node or nodes.

In operation, algorithm 600 allows a component to be notified when a change occurs to a related node. Algorithm 600 only provides notification when a change occurs, and does not require the component to periodically issue a query to determine whether a change has occurred. In addition, algorithm 600 avoids other problems that can exist with disseminating information about changes to system state, settings or configuration to other affected systems.

Figure 7:
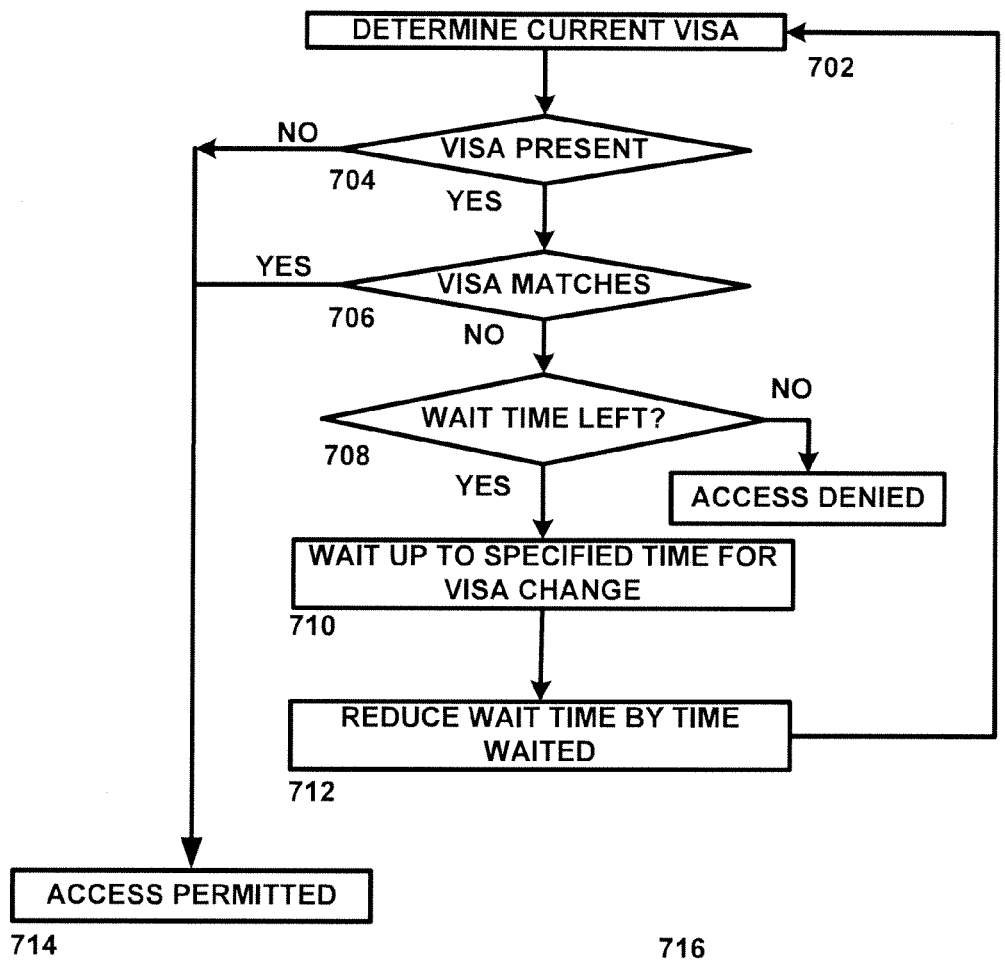
FIG. 7 is a flow chart of an algorithm for determining whether a node may be accessed based on a current locked state of the node and a visa supplied with an access request in accordance with an exemplary embodiment of the present invention.

FIG. 7 is a flow chart of an algorithm 700 for determining whether a node may be accessed based on a current locked state of the rode and a visa supplied with an access request. Algorithm 700 implements a wait behavior, where a period of time is used to wait for a node to become accessible if it is not unlocked. Algorithm 700 can be implemented in hardware or a suitable combination of hardware and software, such as by converting the flowchart algorithm to software code that will operate on a multi-function peripheral processor using standard programming techniques. In one exemplary embodiment, the behavior on a visa mismatch is a specification of a period of time to wait for the node to be accessible, where the period time can be a predetermined period of time, a variable period of time or other suitable periods of time.

Algorithm 700 begins at 702, where a node to be access has been identified. A current visa is determined by examining the node to see if it has a direct lock and associated visa. If it determined that a direct lock and visa exists, that visa is used to match for the following steps. If no direct lock and visa exists for the node, then each containing node is examined until a top level of the structure is reached or an inherited lock and visa is found. If it determined that an inherited lock and visa exists, that visa is used to match for the following steps. The algorithm continues with 704.

At 704, if a direct or inherited lock and associated visa were not found, the algorithm continues to 714 and the access is permitted. If any lock was found, the algorithm continues to 706.

At 706 the visa found in 702 is compared with the visa supplied. If the visa matches, the algorithm proceeds to 714 and the access is permitted. If the visa does not match, the algorithm continues at 708.

At 708, the time remaining to wait is examined. If there is no remaining time to wait, the algorithm continues to 716 and access is denied. If there is time remaining, the algorithm continues at 712.

At 710, the algorithm waits until either the specified time has elapsed, or a change has been made to the locks which could result in access being allowed. When such a change has occurred, or when the time period has elapsed, the algorithm continues at 712.

At 712, if the wait was for a specific period, the time spent in step 710 is subtracted from the remaining period. The algorithm continues to 702 to attempt again to match the supplied visa with the node to be accessed.

Figure 8:
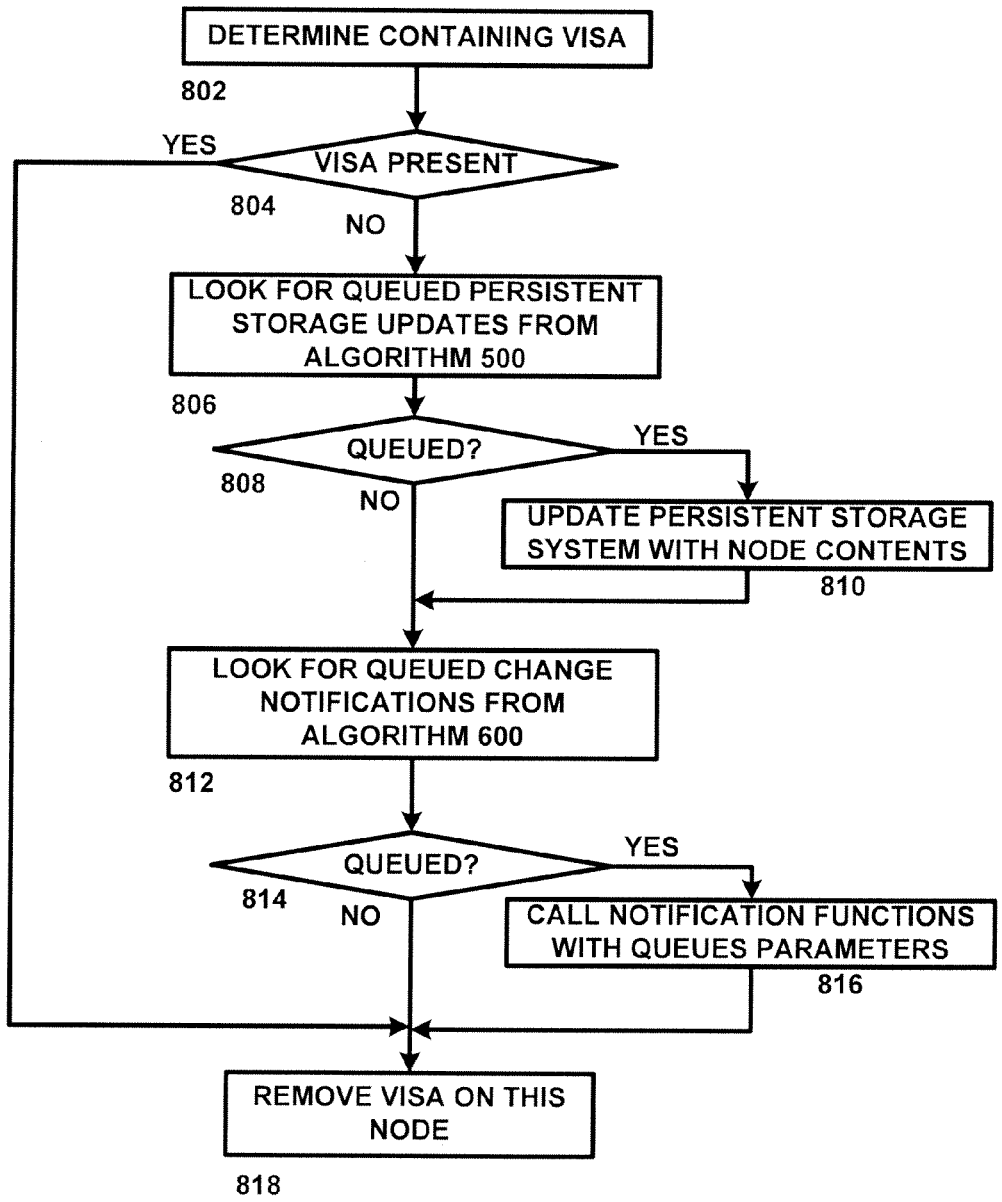
FIG. 8 is a flow chart of an algorithm for unlocking a node in accordance with an exemplary embodiment of the present invention.

FIG. 8 is a flow chart of an algorithm 800 for unlocking a node. When a node is unlocked, the visa is set to the value of the immediately containing node if it is either directly or indirectly locked, or to zero if the node is now completely unlocked. Algorithm 800 can be used to implement delayed persistent storage updates and delayed change notifications, as described in algorithms 500 and algorithm 600. Algorithm 800 can be implemented in hardware or a suitable combination of hardware and software, such as by converting the flowchart algorithm to software code that will operate on a multi-function peripheral processor using standard programming techniques.

Algorithm 800 begins at 802, in which a visa of any containing node is determined. The algorithm continues with 804.

At 804, if a visa was found, the node is not unlocked as it is indirectly locked by a node which contains it. The algorithm continues with 818.

At 806, the queue of persistent storage updates from algorithm 500 is examined for entries which apply to this node or any sub-nodes.

At 808, if no persistent storage updates were found, the algorithm continues with 812.

At 810, the queued persistent storage updates are performed to the associated memory system, and the updates are removed from the queue. In one exemplary embodiment, information may have been updated many times while the node was locked, and the associated memory system can be updated once with the most recent value stored in the node or sub-node. Other suitable update procedures can also or alternatively be used.

At 812, the queue of pending change notifications is examined for entries which apply to this node or any sub-nodes.

At 814, if no applicable change notifications are found, the algorithm continues with 818.

At 816, the queued pending change notifications are performed by calling the notification functions with their argument, and the reason for change. In one exemplary embodiment, where multiple changes have occurred while the node or sub-node was locked, each function can be called once for each argument regardless of how many changes were queued, where the reason for change argument can the union of the one or more change notification reasons. Other suitable function call processes can also or alternatively be used.

It should be emphasized that the above-described embodiments are merely examples of possible implementations. Suitable variations and modifications can be made to the above-described embodiments without departing from the principles of the present disclosure. All such modifications and variations are intended to be included herein within the scope of this disclosure and protected by the following claims.

What is claimed is:

1. A database system comprising:
    a configuration node value stored in a first electronic data memory device sector that identifies an execution state of an application;
    a lock state and access visa associated with the node value, such that when the visa is non-zero, the visa must be presented to access the node;
    a notification field associated with the node value, the notification field stored in a second electronic data memory device sector; and
    an update processor configured to electronically retrieve and process the notification field when the node value is modified.

2. The database system of claim 1 wherein the update processor is configured to perform a function stored in the notification field when the node value is modified.

3. The database system of claim 1 wherein the update processor is configured to transmit at least a portion of the node value to an address stored in the notification field when the node value is modified.

4. The database system of claim 1 wherein the update processor is contained within the database system.

5. The database system of claim 1 wherein the update processor is configured to transmit at least a portion of the node value to an address stored in the notification field when the node value is modified, wherein the address is associated with a system that is external to the database system.

6. The database system of claim 1 further comprising:
    a plurality of notification fields associated with the node value, each of the plurality of notification fields stored in the second electronic data memory device sector; and
    the update processor configured to electronically retrieve and process each of the notification fields when the node value is modified.

7. The database system of claim 6 wherein the update processor is configured to perform a function stored in one of the notification fields when the node value is modified, and to transmit at least a portion of the node value to an address stored in a second notification field when the node value is modified.

8. The database system of claim 6 wherein the update processor is configured to transmit at least a portion of the node value to a first address stored in the notification field when the node value is modified and to transmit at least a portion of the node value to a second address stored in the notification field when the node value is modified, wherein the first address is associated with a first system that is external to the database system and the second address is associated with a second system that is external to the database system.

9. A method for database management comprising:
    storing a data value in a first electronic data memory device sector;
    storing a first notification field in a second electronic data memory device sector associated with the first electronic data memory device sector;
    retrieving the first notification field if the data value in the first electronic data memory device sector is modified;
    performing a function defined by the first notification field by transmitting at least a portion of the modified data value to an address stored in the first notification field;
    storing a second notification field in the second electronic data memory device sector associated with the first electronic data memory device sector;
    retrieving the second notification field when the data value in the first electronic data memory device sector is modified;
    performing a function defined by the second notification field by transmitting at least a portion of the modified data value to an address stored in the second notification field; and
    wherein the address stored in the first notification field is associated with a first system and the address stored in the second notification field is associated with a second system.

10. The method of claim 9 wherein performing the function defined by the first notification field comprises transmitting at least a portion of the modified data value to an address stored in the first notification field.

11. The method of claim 9 wherein the address stored in the first notification field is different from the address stored in the second notification field.

12. The method of claim 9 wherein the first system and the second system are different from a database system.

13. The database system of claim 1 wherein the execution state of the application comprises one of a pending state, a started state, a started and failed state and a completed state.

14. The database system of claim 1 wherein the execution state of the application is stored when a loss of power occurs.

15. A database system comprising:
- a configuration node value stored in a first electronic data memory device sector that identifies an execution state of an application;
- a lock state and access visa associated with the node value, such that when the visa is non-zero, the visa must be presented to access the node;
- a notification field associated with the node value, the notification field stored in a second electronic data memory device sector;
- an update processor contained within the database system and configured to electronically retrieve and process the notification field when the node value is modified; and wherein the execution state of the application is stored when a loss of power occurs.

16. The database system of claim 15 wherein the update processor is configured to perform a function stored in the notification field when the node value is modified.

17. The database system of claim 15 wherein the update processor is configured to transmit at least a portion of the node value to an address stored in the notification field when the node value is modified.

18. The database system of claim 15 wherein the update processor is configured to transmit at least a portion of the node value to an address stored in the notification field when the node value is modified, wherein the address is associated with a system that is external to the database system.

19. The database system of claim 15 further comprising:
- a plurality of notification fields associated with the node value, each of the plurality of notification fields stored in the second electronic data memory device sector; and
- the update processor configured to electronically retrieve and process each of the notification fields when the node value is modified.

20. The database system of claim 19 wherein the update processor is configured to perform a function stored in one of the notification fields when the node value is modified, and to transmit at least a portion of the node value to an address stored in a second notification field when the node value is modified.

* * * * *